(12) United States Patent
Lighty (10) Patent No.: US 11,661,856 B2
(45) Date of Patent: May 30, 2023

(54) GAS TURBINE ENGINE WITH EMBEDDED GENERATOR

(71) Applicant: Rolls-Royce North American Technologies Inc., Indianapolis, IN (US)

(72) Inventor: Kerry J. Lighty, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 250 days.

(21) Appl. No.: 17/206,859

(22) Filed: Mar. 19, 2021

(65) Prior Publication Data

US 2022/0298923 A1 Sep. 22, 2022

(51) Int. Cl.
*F01D 15/10* (2006.01)
*F02C 7/06* (2006.01)
*F02C 7/26* (2006.01)

(52) U.S. Cl.
CPC ............. *F01D 15/10* (2013.01); *F02C 7/06* (2013.01); *F02C 7/26* (2013.01); *F05D 2220/76* (2013.01); *F05D 2260/98* (2013.01)

(58) Field of Classification Search
CPC .. F01D 15/10; F05B 2220/76; F05D 2260/98; F02C 7/06; F02C 7/26
See application file for complete search history.

(56) References Cited

U.S. PATENT DOCUMENTS

| | | | |
|---|---|---|---|
| 6,750,572 B2 | 6/2004 | Tornquist et al. |
| 6,897,581 B2 | 5/2005 | Doherty et al. |
| 6,903,470 B2 | 6/2005 | Doherty et al. |
| 6,914,344 B2 | 7/2005 | Franchet et al. |
| 7,224,082 B2 | 5/2007 | Bouiller et al. |
| 7,495,354 B2 | 2/2009 | Hermann |
| 7,619,331 B2 | 11/2009 | Bouiller et al. |
| 9,341,117 B2 | 5/2016 | Remer et al. |
| 9,714,609 B2 | 7/2017 | French et al. |
| 2020/0109646 A1 | 4/2020 | Black et al. |

*Primary Examiner* — Sean Gugger
(74) *Attorney, Agent, or Firm* — Barnes & Thornburg LLP (57) ABSTRACT

A gas turbine engine includes a sump housing, an electric generator, and a shaft assembly and includes features for directing lubrication fluid away from the electric generator. The sump housing is configured to collect the lubrication fluid and air used in the gas turbine engine. The electric generator is located in the sump housing and configured to produce electric energy during use of the gas turbine engine. The shaft assembly extends through the electric generator and may be coupled with the electric generator.

20 Claims, 8 Drawing Sheets

GAS TURBINE ENGINE WITH EMBEDDED GENERATOR

FIELD OF THE DISCLOSURE

The present disclosure relates generally to gas turbine engines and more specifically to gas turbine engines with embedded generators.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Many gas turbine engines include lubrication systems that circulate lubricants throughout the engine. These lubrication systems may clean, cool, and distribute lubricants, such as lubrication fluid, to bearings and other parts of the engine. Some lubrication systems may control the flow of the lubrication fluid to prevent leakage and/or flow into unwanted parts of the engine.

SUMMARY

The present disclosure may comprise one or more of the following features and combinations thereof.

A gas turbine engine may comprise a sump housing for collecting lubrication fluid and air used in the gas turbine engine, an electric generator located in the sump housing, and a first shaft assembly. The sump housing may be arranged circumferentially around an axis to define an internal chamber within the sump housing. The electric generator may be configured to produce electric energy during use of the gas turbine engine. The first shaft assembly may be arranged along the axis.

In some embodiments, the electric generator may include a rotor and a stator. The rotor may be configured to rotate about the axis. The stator may be arranged circumferentially around the rotor and fixed to the sump housing. The stator may be spaced apart radially from the rotor to form an annular gap between the stator and the rotor.

In some embodiments, the first shaft assembly may include a first shaft, a first bearing, and a first slinger. The first shaft may extend axially through the rotor and configured to rotate about the axis. The first bearing may be coupled to the first shaft. The first slinger may be coupled with the first shaft for rotation with the first shaft.

In some embodiments, the first slinger may be located axially between the first bearing and the electric generator. The first slinger may extend radially outward away from the first shaft to direct the lubrication fluid in contact with the first slinger radially outward away from the axis so that the lubrication fluid is directed away from the annular gap between the stator and the rotor.

In some embodiments, the sump housing may be formed to define a first scavenge passageway. The first scavenge passageway may extend radially into the sump housing for conducting the lubrication fluid out of the internal chamber of the sump housing.

In some embodiments, the first scavenge passageway may include an inlet. The inlet of the first scavenge passageway may be axially aligned with the first slinger so that at least a portion of the lubrication fluid directed radially outward by the first slinger is directed into the inlet.

In some embodiments, the sump housing may be formed to define a second scavenge passageway. The second scavenge passageway may extend radially into the sump housing.

In some embodiments, the second scavenge passageway may include an inlet. The inlet of the second scavenge passageway may be spaced apart axially from the inlet of the first scavenge passageway to locate the first bearing axially between the inlet of the first scavenge passageway and the inlet of the second scavenge passageway.

In some embodiments, the second scavenge passageway may include an outlet. The outlet of the second scavenge passageway may be arranged to direct the lubrication fluid into the first scavenge passageway.

In some embodiments, the first scavenge passageway may extend radially inward from the inlet. The first scavenge passageway may then extend axially along the stator included in the electric generator along a linear path.

In some embodiments, the sump housing may be formed to include an axially extending first slot. The stator may be formed to include an axially extending second slot. The axially extending second slot included in the stator may be circumferentially aligned with the axially extending first slot to define a portion of the first scavenge passageway.

In some embodiments, the gas turbine engine may further comprise a second shaft assembly. The second shaft assembly may be arranged along the axis.

In some embodiments, the second shaft assembly may include a second shaft, a second bearing, and a second slinger. The second shaft may extend axially through the rotor and configured to rotate about the axis. The second bearing may be coupled to the second shaft. The second slinger may be coupled with the second shaft for rotation with the second shaft.

In some embodiments, the second slinger may be located axially between the second bearing and the electric generator to locate the electric generator axially between the first slinger and the second slinger. The second slinger may extend radially outward away from the second shaft.

In some embodiments, the sump housing may be formed to define a first scavenge passageway and a second scavenge passageway. The first scavenge passageway may have a first inlet that opens into the internal chamber. The second scavenge passageway may have a second inlet that opens into the internal chamber.

In some embodiments, the first inlet may be aligned axially with the first slinger and the second inlet may be aligned axially with the second slinger. The first inlet may be spaced apart axially from the second inlet to locate the stator axially between the first inlet and the second inlet. The first scavenge passageway may extend axially along the stator and open into the second scavenge passageway.

In some embodiments, the sump housing may be formed to include a vent passageway. The vent passageway may be configured to conduct air and lubrication mist around the stator.

In some embodiments, the vent passageway may include an inlet and an outlet. The inlet and outlet may open into the internal chamber.

In some embodiments, the vent passageway may extend radially outward from the inlet. The vent passageway may then turn and extend axially along the stator. The vent passageway may then turn radially inward to the outlet.

According to another aspect of the present disclosure, a gas turbine engine comprise a sump housing for collecting lubrication fluid and air used in the gas turbine engine, an electric generator located in the sump housing, and a first shaft assembly. The sump housing may be arranged circumferentially around an axis to define an internal chamber. The electric generator may be configured to produce electric energy during use of the gas turbine engine. The first shaft assembly may be arranged along the axis.

In some embodiments, the electric generator may include a rotor and a stator. The rotor may be configured to rotate about the axis. The stator may be arranged circumferentially around the rotor and fixed to the sump housing for movement with the sump housing.

In some embodiments, the first shaft assembly may include a first shaft, a first bearing, and a first slinger. The first shaft may extend axially through the rotor. The first shaft may be configured to rotate about the axis. The first bearing may be coupled to the first shaft. The first slinger may be coupled with the first shaft for rotation with the first shaft.

In some embodiments, the first slinger may be located axially between the first bearing and the electric generator. The first slinger may extend radially outward away from the first shaft to direct the lubrication fluid in contact with the first slinger radially outward away from the axis.

In some embodiments, the sump housing may be formed to define a first scavenge passageway. The first scavenge passageway may extend radially into the sump housing. An inlet of the first scavenge passageway may be axially aligned with the first slinger.

In some embodiments, the sump housing may be formed to define a second scavenge passageway. The second scavenge passageway may extend radially into the sump housing. An inlet of the second scavenge passageway may be spaced apart axially from the inlet of the first scavenge passageway to locate the first bearing axially between the inlet of the first scavenge passageway and the inlet of the second scavenge passageway.

In some embodiments, the first scavenge passageway may extend radially inward from the inlet. The first scavenge passageway may then extend axially along the stator included in the electric generator along a linear path.

In some embodiments, the sump housing may be formed to include an axially extending first slot and the stator may be formed to include an axially extending second slot. The axially extending second slot may be circumferentially aligned with the axially extending first slot to define a portion of the first scavenge passageway.

In some embodiments, may further comprise a second shaft assembly. The second shaft assembly may be arranged along the axis.

In some embodiments, the second shaft assembly may include a second shaft, a second bearing, and a second slinger. The second shaft may extend axially through the rotor. The second shaft may be configured to rotate about the axis. The second bearing may be coupled to the second shaft. The second slinger may be coupled with the second shaft for rotation with the second shaft.

In some embodiments, the second slinger may be located axially between the second bearing and the electric generator to locate the electric generator axially between the first slinger and the second slinger. The second slinger may extend radially outward away from the second shaft.

In some embodiments, the sump housing may be formed to define a first scavenge passageway and a second scavenge passageway. The first scavenge passageway may have a first inlet that opens into the internal chamber. The second scavenge passageway may have a second inlet that opens into the internal chamber. The first inlet may be aligned axially with the first slinger and the second inlet may be aligned axially with the second slinger.

In some embodiments, the first inlet may be spaced apart axially from the second inlet to locate the stator axially between the first inlet and the second inlet. The first scavenge passageway may extend axially along the stator and open into the second scavenge passageway.

In some embodiments, the sump housing may be formed to include a vent passageway. The vent passageway may be configured to conduct air and lubrication mist around the stator.

In some embodiments, the vent passageway may include an inlet and an outlet that open into the internal chamber. The vent passageway may extend radially outward from the inlet. The vent passageway may then turn and extend axially along the stator. The vent passageway may then turn radially inward to the outlet.

According to another aspect of the present disclosure, a method may comprise providing a gas turbine engine that includes a sump housing for collecting lubrication fluid and air used in the gas turbine engine, an electric generator located in the sump housing, and a first shaft assembly. The electric generator may be configured to produce electric energy during use of the gas turbine engine. The first shaft assembly may be arranged along an axis.

In some embodiments, the electric generator may include a rotor and a stator. The rotor may be configured to rotate about the axis. The stator may be arranged circumferentially around the rotor and fixed to the sump housing for movement with the sump housing.

In some embodiments, the first shaft assembly may include a first shaft, a first bearing, and a first slinger. The first shaft may extend axially through the rotor and may be configured to rotate about the axis. The first bearing may be coupled to the first shaft. The first slinger may be coupled with the first shaft for rotation with the first shaft.

In some embodiments, the method may further comprise starting the gas turbine engine so that the first shaft assembly rotates about the axis. The method may further comprise directing a flow of lubrication fluid into an internal chamber of the sump housing to lubricate and cool the first bearing. The method may further comprise directing the flow of lubrication radially outward away from the axis with the first slinger so that the lubrication fluid is guided away from an annular gap between the stator and the rotor of the electric generator.

In some embodiments, the sump housing may be formed to define a first scavenge passageway. The first scavenge passageway may extend radially into the sump housing. An inlet of the first scavenge passageway may be axially aligned with the first slinger so that at least a portion of the lubrication fluid directed radially outward by the first slinger is directed into the inlet.

In some embodiments, the first scavenge passageway may extend radially inward from the inlet. The first scavenge passageway may extend axially along the stator included in the electric generator along a linear path.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
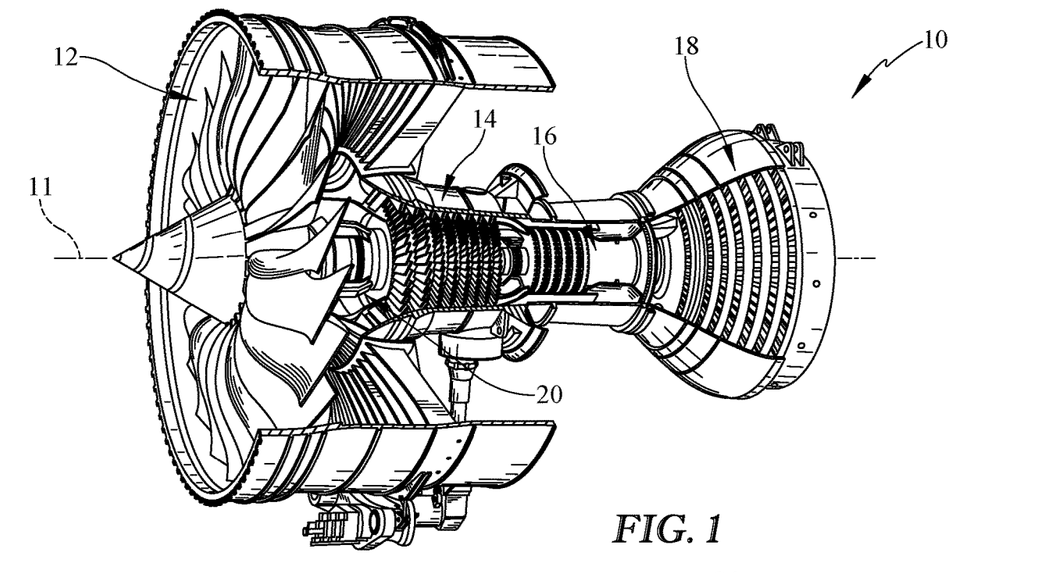
FIG. 1 is a cut-away perspective view of a gas turbine engine showing that the exemplary engine includes a fan, a compressor, a combustor, a turbine, and an embedded generator configured to produced electric energy during use of the gas turbine engine.
Figure 2:
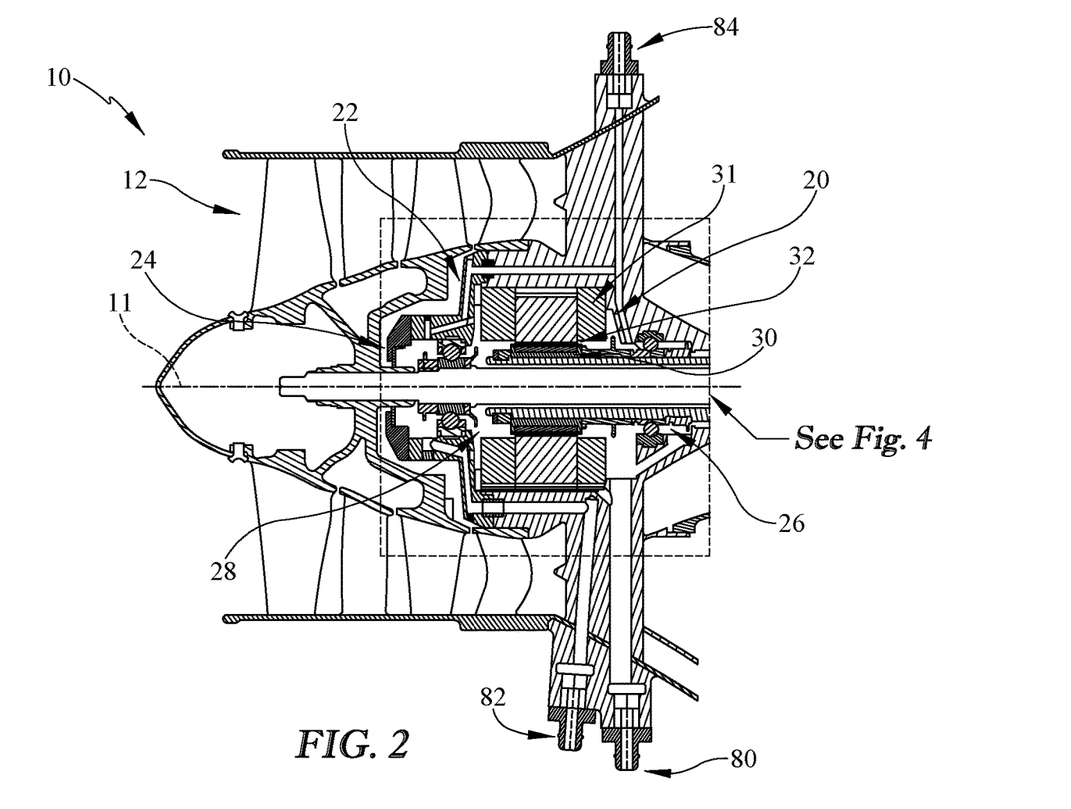
FIG. 2 is a cross-section view of the gas turbine engine of FIG. 1 showing the gas turbine engine further includes a sump housing for collecting lubrication fluid and air used for cooling co-axial shaft assemblies in the gas turbine engine and further showing the sump housing is arranged circumferentially around an axis of the gas turbine engine to define an internal chamber in which the generator is located and first and second co-axial shaft assemblies arranged along the axis through a portion of the generator.

An illustrative aerospace gas turbine engine 10 is shown in FIG. 1. The gas turbine engine 10 includes an electric generator 20, a sump housing 22, and shaft assemblies 24, 26 as shown in FIGS. 2-7 and 10. The electric generator 20 is located in the sump housing 22 and configured to produce electric energy during use of the gas turbine engine 10. The sump housing 22 is arranged circumferentially around an axis 11 of the gas turbine engine 10 to define an internal chamber 28 within the sump housing 22 for collecting lubrication fluid and air used in the gas turbine engine 10. The shaft assemblies 24, 26 are arranged along the axis 11 of the gas turbine engine 10 through a portion of the generator 20 and are configured to rotate about the axis 11.

Figure 3:
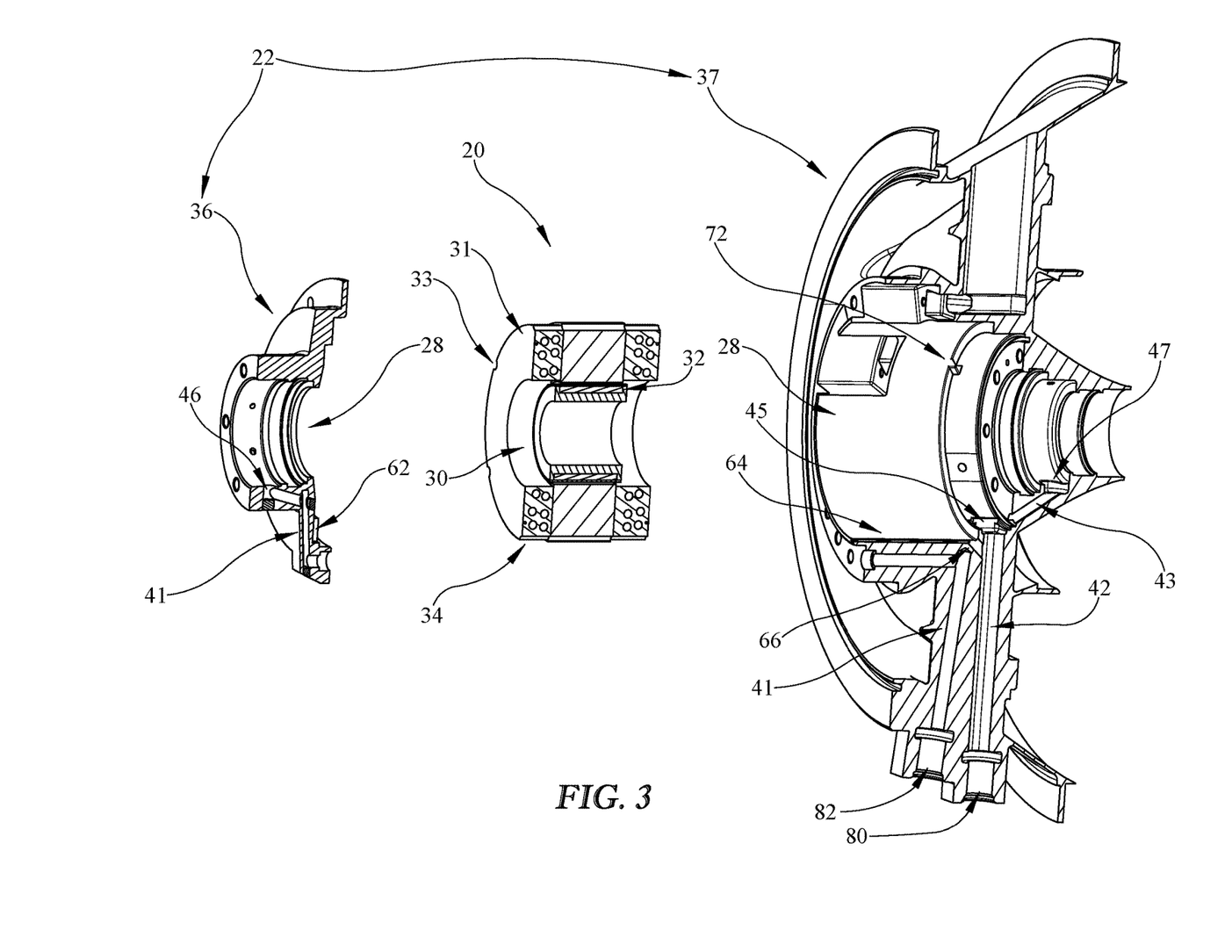
FIG. 3 is an exploded cross-section view of the sump housing included in the gas turbine engine of FIG. 2 showing the sump housing includes a sump cover and a front frame with the generator located therebetween and suggesting that the sump cover and the front frame are shaped to define scavenge passageways for conducting the lubrication fluid around the generator and out of the internal chamber of the sump housing.
Figure 4:
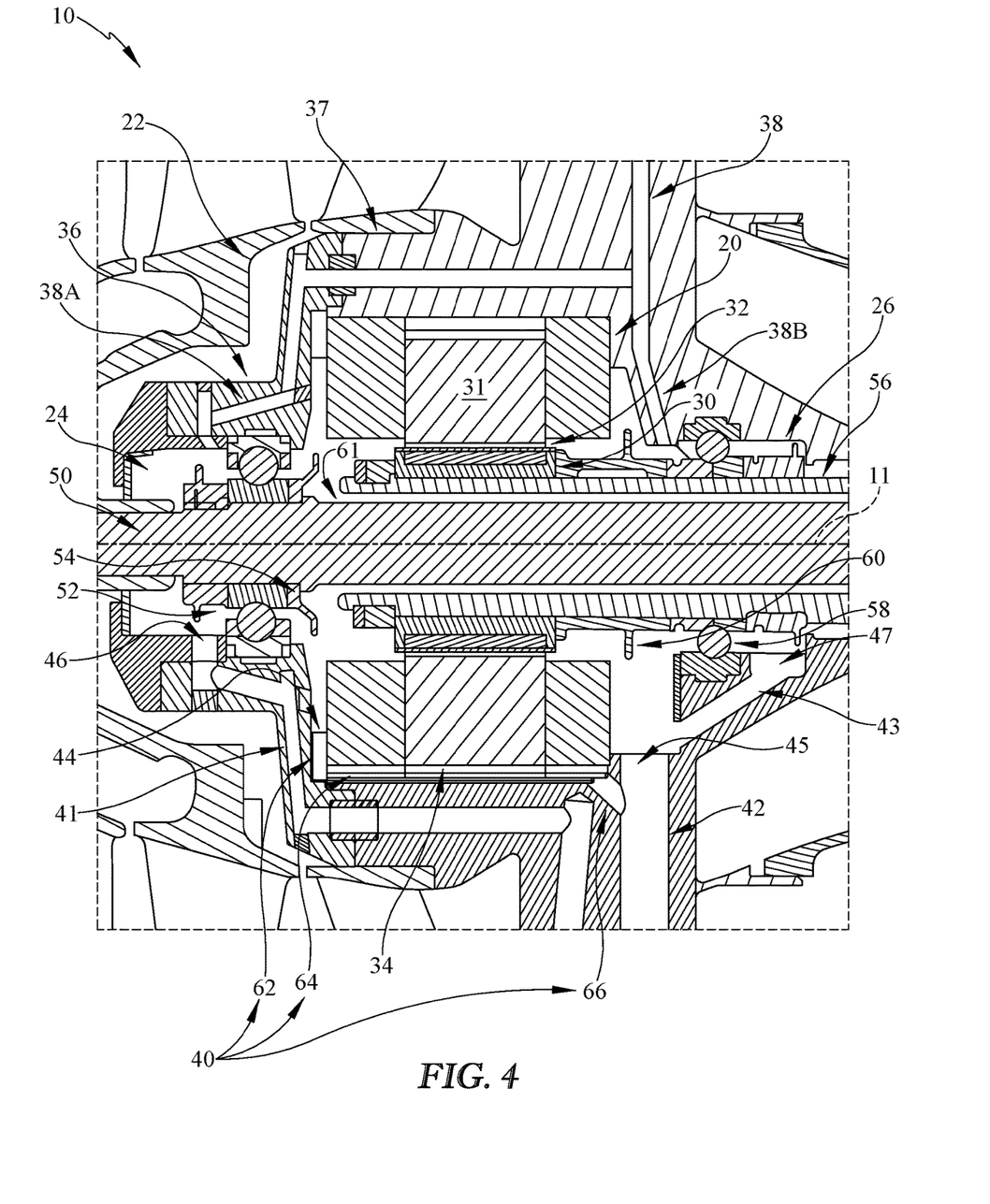
FIG. 4 is a detail view of FIG. 2 showing each of the shaft assemblies includes a shaft that extends axially through a rotor of the generator and is configured to rotated about the axis, a bearing coupled to the shaft, and a slinger coupled with the shaft for rotation with the shaft that directs the lubrication fluid in contact with the slinger radially outward away from the axis so that the lubrication fluid is directed away from an annular gap in the generator.

The electric generator 20 includes a rotor 30 configured to rotate about the axis 11 and a stator 31 arranged circumferentially around the rotor 30 as shown in FIGS. 2-7 and 10. The stator 31 is fixed to the sump housing 22 for movement with the sump housing 22. In the illustrative embodiment, the stator 31 is spaced apart radially from the rotor 30 to form an annular gap 32 between the stator 31 and the rotor 30 as shown in FIG. 4.

Figure 10:
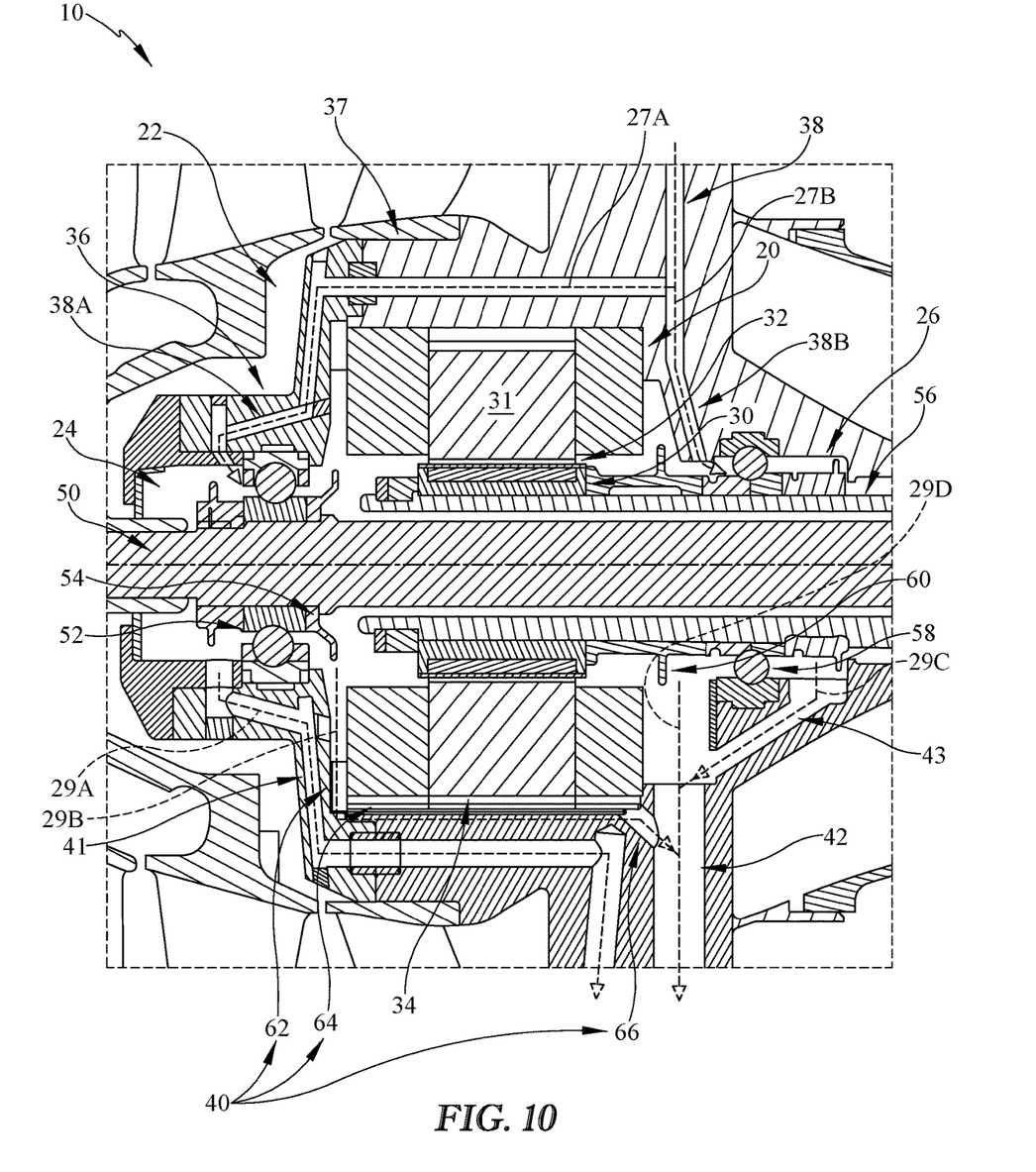
FIG. 10 is a view similar to FIG. 4 showing a supply flow path of the lubrication fluid to the bearings of the first and second shaft assemblies and a discharge flow path of the lubrication fluid through the scavenge passageways in the sump housing.

Lubrication fluid is conducted into the internal chamber 28 along a supply flow path to lubricate bearings 52, 58 included in the shaft assemblies 24, 26 as suggested by dotted lines 27A, 27B in FIG. 10. As the lubrication fluid contacts the bearings 52, 58, the lubrication fluid may flow towards the annular gap 32 in the generator 20. If the lubrication fluid gets in the annular gap 32, the performance of the generator 20 may be negatively impacted.

To prevent the lubrication fluid from entering the annular gap 32 of the generator 20, the shaft assemblies 24, 26 further include slingers 54, 60 coupled with the corresponding shafts 50, 56 for rotation with the shafts 50, 56 as shown in FIGS. 4-7 and 10. The slingers 54, 60 are located axially between the bearings 52, 58 and the electric generator 20 and extend radially outward away from the shafts 50, 56. The slingers 54, 60 direct a discharge flow of the lubrication fluid 29B, 29D in contact with the slingers 54, 60 radially outward away from the axis 11 so that the lubrication fluid is directed away from annular gap 32 between the stator 31 and the rotor 30.

The sump housing 22 includes scavenge passageways 40, 41, 42, 43 for each of the bearings 52, 58 that each extend radially into the sump housing 22 for conducting the lubrication fluid out of the internal chamber 28 of the sump housing 22 as shown in FIGS. 3-6 and 10. Each of the first fore scavenge passageway 40 and the first aft scavenge passageway 42 have inlets 44, 45 that are axially aligned with the corresponding slingers 54, 60 so that at least a portion of the lubrication fluid directed radially outward by the slingers 54, 60 are directed into the inlets 44, 45. Each of the second fore scavenge passageway 41 and the second aft scavenge passageway 43 have inlets 46, 47 that are each spaced apart axially from the corresponding inlets 44, 45 of the first fore scavenge passageway 40 and the first aft scavenge passageway 42. For instance, the inlet 46 of the second fore scavenge passageway 41 is spaced apart axially from the inlet 44 of the first fore scavenge passageway 40 to locate the first bearing 52 axially between the inlets 44, 46. Similarly, the inlet 47 of the second aft scavenge passageway 43 is spaced apart axially from the inlet 45 of the first aft scavenge passageway 42 to located the second bearing 58 axially between the inlets 45, 47.

Turning again to the gas turbine engine 10, the gas turbine engine 10 further includes a fan 12, a compressor 14, a combustor 16, and a turbine 18, and the generator 20 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. The generator 20 is coupled to the turbine 18 to generator electrical energy from the rotation of the turbine 18.

In the illustrative embodiment, the turbine 18 has low-pressure turbine rotor coupled to a low-pressure shaft 50 of the low-pressure shaft assembly 24 and a high-pressure turbine rotor coupled to a high-pressure shaft 56 of the high-pressure shaft assembly 26. The low-pressure shaft assembly 24, also referred to as the first shaft assembly 24, drives the fan 12, while the high-pressure shaft assembly 26, also referred to as the second shaft assembly 26, drives the compressor 14 in the illustrative embodiment.

The first shaft assembly 24 includes the first shaft 50, the first bearing 52, and the first slinger 54 as shown in FIGS. 4-6 and 10. The first shaft 50 extends axially through the rotor 30 and is configured to rotate about the axis 11. The first bearing 52 is coupled to the first shaft 50. The first slinger 54 is coupled with the first shaft 50 for rotation with the first shaft 50. In the illustrative embodiment, the rotor 30 is coupled to the second shaft 56.

The second shaft assembly 26 includes the second shaft 56, a second bearing 58, and a second slinger 60 as shown in FIGS. 4-6 and 10. The second shaft 56 extends axially through the rotor 30 and is configured to rotate about the axis 11. The second bearing 58 is coupled to the second shaft 56. The second slinger 60 is coupled with the second shaft 56 for rotation with the second shaft 56.

The sump housing 22 has a supply passageway 38, a first set of fore scavenge passageways 40, 41 for the first bearing 52, a second set of aft scavenge passageways 42, 43 for the second bearing 58, and at least one vent passageway 48 as shown in FIGS. 3-7 and 10. The supply passageway 38 extends through a strut before the supply passageway 38 diverges into two passageways 38A, 38B that are configured to conduct lubrication fluid to the corresponding bearings 52, 58. The first set of fore scavenge passageways 40, 41 includes the first fore scavenge passageway 40 and second fore scavenge passageway 41 to remove lubrication fluid axially forward and aft of the first bearing 52. The second set of scavenge passageways 42, 43 includes the first aft scavenge passageway 42 and second aft scavenge passageway 43 to remove lubrication fluid axially forward and aft of the second bearing 58. The vent passageway 48 is configured to conduct air and lubrication mist around the stator 31.

For the first bearing 52, the supply flow of lubrication fluid 27A is introduced axially forward of the first bearing 52 through the first supply passageway 38A formed in the sump housing 22 as shown in FIG. 10. The low-pressure rotor thrust is aft, which will tend to pump the lubrication fluid forward in the bearing 52. The inlet 46 of the second fore scavenge passageway 41 is located axially forward of the bearing 52 to collect a majority of a first discharge flow of the lubrication fluid 29A. For any lubrication fluid that makes its way aft through the bearing 52, the slinger 54 is there to direct a second discharge flow of the lubrication fluid 29B radially away from the rotor 30 to the inlet 44 of the first fore scavenge passageway 40 as shown in FIG. 10.

The first fore scavenge passageway 40 includes a radial slot 62, an axially-extending slot 64, and an angular hole 66 as shown in FIGS. 3-6 and 10. The radial slot 62 extends radially inward from the inlet 44. The axially-extending slot 64 extends axially along a linear path from the radial slot 62. The angular hole 66 extends from the axially-extending slot 64 and opens into the first aft scavenge passageway 42 for the second bearing 58.

Figure 5:
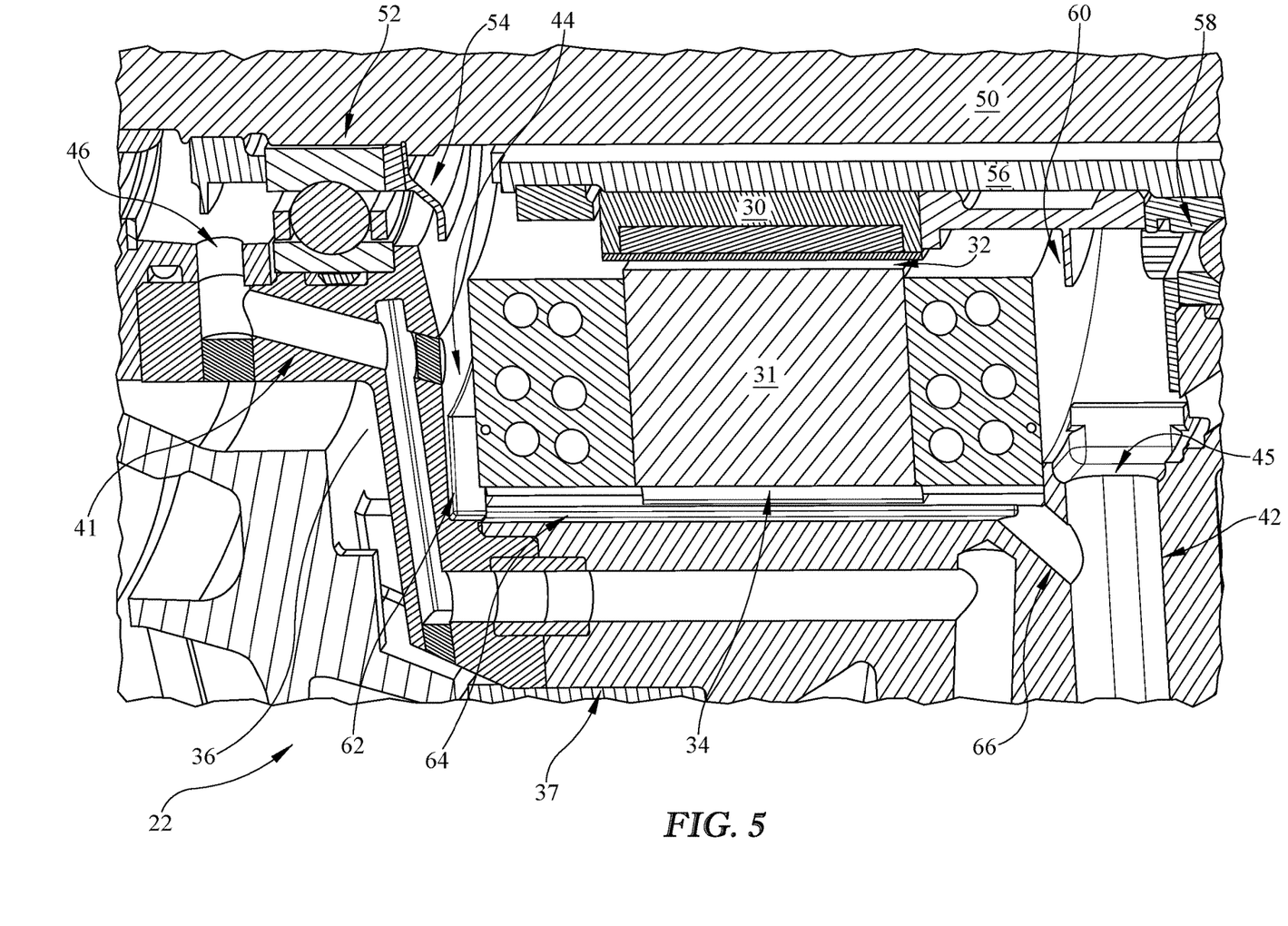
FIG. 5 is an enlarged perspective cross-section view of the gas turbine engine of FIG. 1 showing the sump housing is formed to include a radial slot and an axially extending first slot extending from the radial slot that is circumferentially aligned with an axially extending second slot formed in the stator to define a portion of a scavenge passageway for the bearing of the first shaft assembly.
Figure 6:
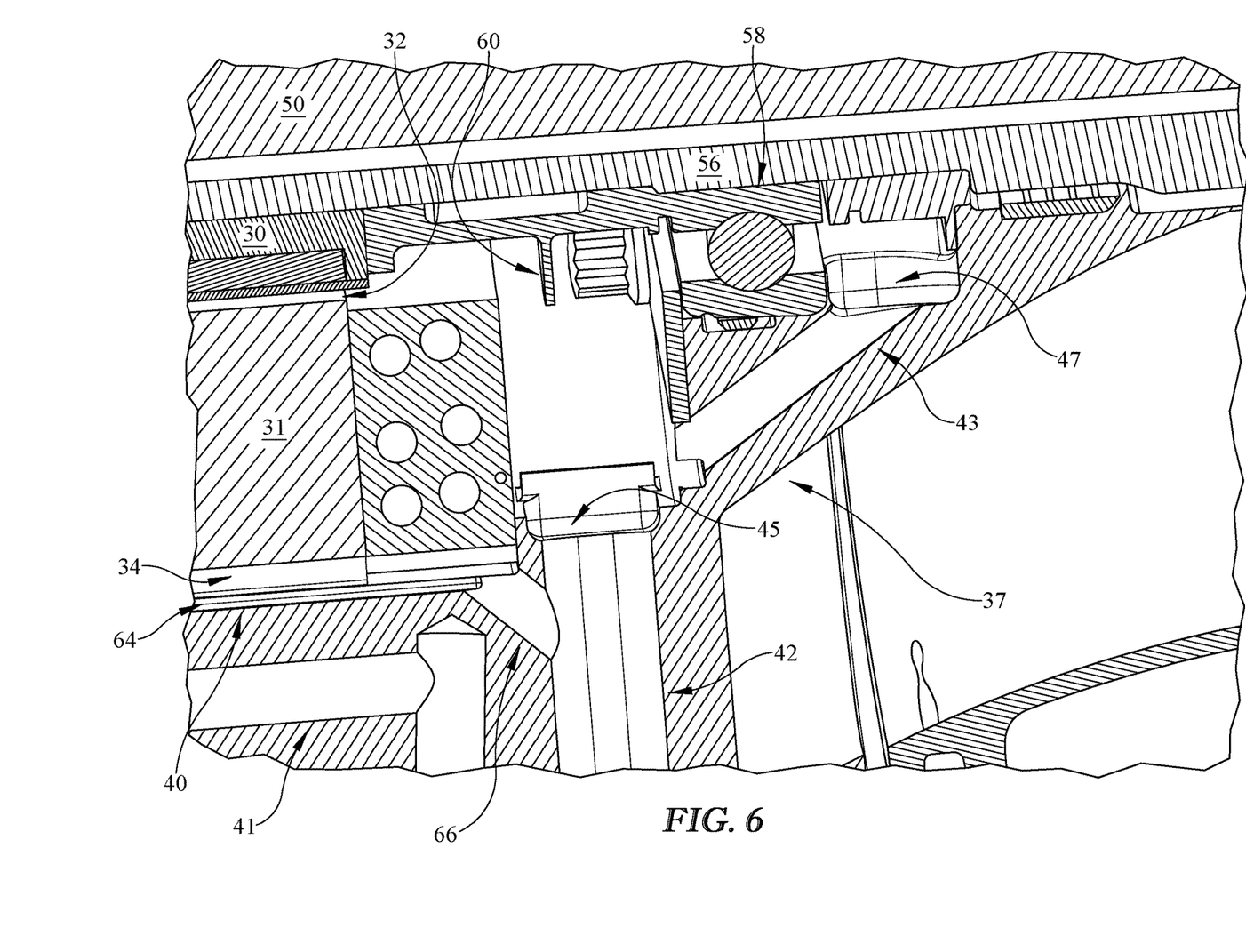
FIG. 6 is an enlarged perspective cross-section view of the gas turbine engine of FIG. 1 showing the sump housing is formed to include additional scavenge passageways for the bearing of the second shaft assembly and further showing one of the scavenge passageways has an inlet radially aligned with the slinger of the second scavenge passageway.

The inlet 44 of the radial slot 62 is axially aligned with the slinger 54 as shown in FIGS. 4, 5, and 10. The inlet 44 of the radial slot 62 is axially aligned with the slinger 54 so that at least a portion of the lubrication fluid directed radially outward by the slinger 54 is directed into the inlet 44. The inlet 46 of the second fore scavenge passageway 41 is spaced apart axially from the inlet 44 of the first fore scavenge passageway 40 to locate the bearing 52 axially between the inlet 44 of the first fore scavenge passageway 40 and the inlet 46 of the second fore scavenge passageway 41.

In the illustrative embodiment, the stator 31 of the generator 20 is formed to include an axially-extending slot 34 as shown in FIGS. 3-6 and 10. The axially-extending slot 34 in the stator 31 of the generator 20 is circumferentially aligned with the axially-extending slot 64 in the sump housing 22 to define a portion of the first fore scavenge passageway 40.

For the second bearing 58, the supply flow of lubrication fluid 27B is introduced axially forward of the second bearing 58 through the second supply passageway 38B formed in the sump housing 22 as shown in FIG. 10. The high-pressure rotor thrust is forward, which will tend to pump the lubrication fluid aft through the bearing 58. The lubrication fluid that finds its way to the aft side of the bearing 58 is collected in the second aft scavenge passageway 43 as shown in FIG. 10. The inlet 47 of the second aft scavenge passageway 43 is located aft to collect a majority of a third discharge flow of lubrication fluid 29C.

The second aft scavenge passageway 43 directs the third discharge flow of the lubrication fluid 29C back to the forward side at the inlet 45 of the first aft scavenge passageway 42. This minimizes the opportunity for the lubrication fluid to find a way to the annular gap 32 in the generator 20. A fourth discharge flow of the lubrication fluid 29D on the forward side of the bearing 58 is directed radially outward by the slinger 60 through the inlet 45 of the first aft scavenge passageway 42.

The inlet 45 of the first aft scavenge passageway 42 is axially aligned with the slinger 60 as shown in FIGS. 4-6 and 10. The inlet 45 of the first aft scavenge passageway 42 is axially aligned with the slinger 60 so that at least a portion of the lubrication fluid directed radially outward by the slinger 60 is directed into the inlet 45. The inlet 47 of the second aft scavenge passageway 43 is spaced apart axially from the inlet 45 of the first aft scavenge passageway 42 to locate the bearing 58 axially between the inlet 45 of the first aft scavenge passageway 42 and the inlet 47 of the second aft scavenge passageway 43.

During use of the gas turbine engine 10, buffer air is also supplied to the internal chamber 28 to prevent the lubrication fluid from leaking out of the internal chamber 28. In the illustrative embodiment, there are three sources of buffer air.

The first and second sources of buffer air enter the internal chamber 28 axially forward of the first bearing 52 and axially aft of the second bearing 58 through a lip seal and a labyrinth seal (not shown). A mist of buffer air and lubrication fluid from an aft shaft assembly of the gas turbine engine 10 is conducted into the internal chamber through an annulus 61 between the first and second shafts 50, 56 to provide the third source.

Figure 7:
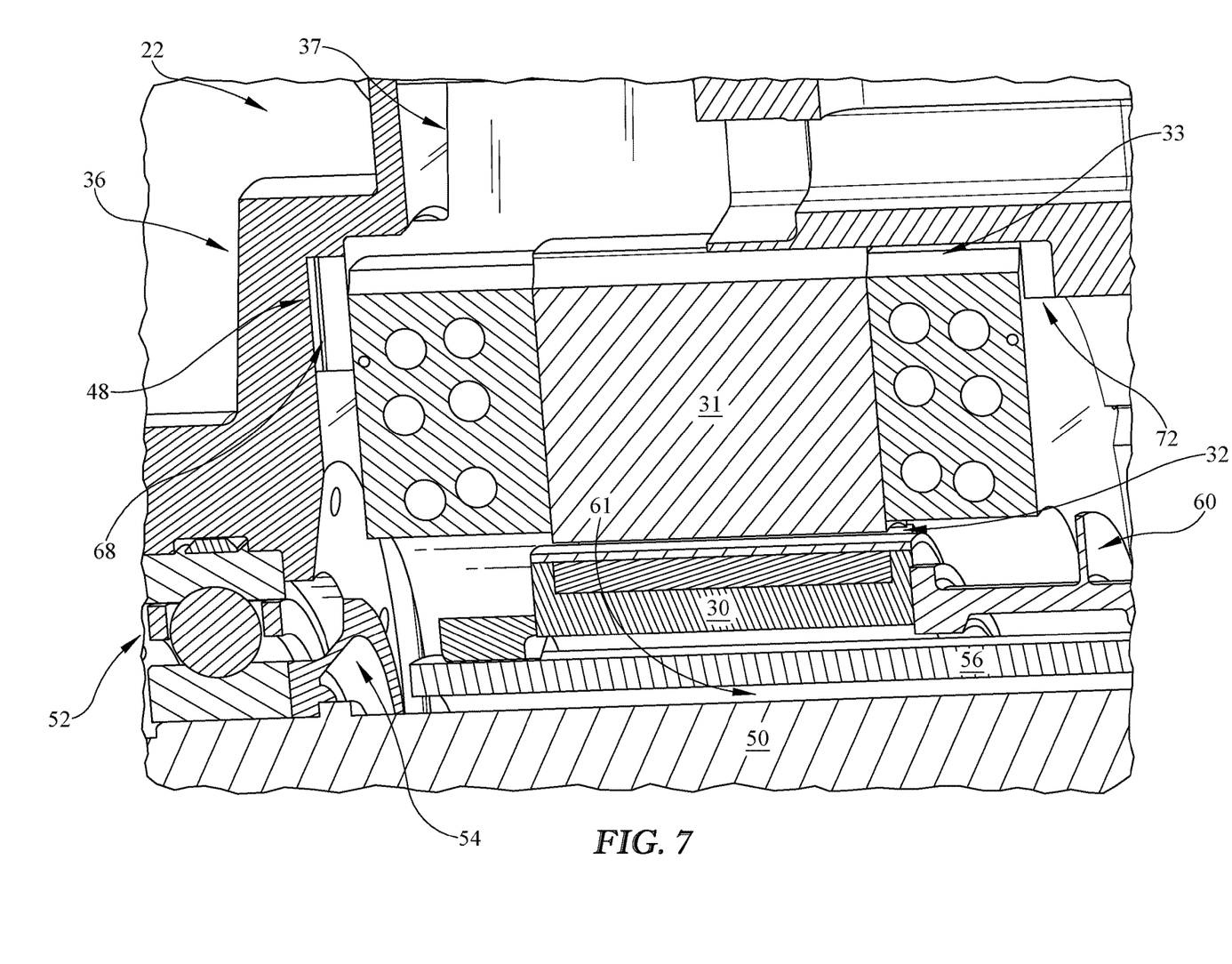
FIG. 7 is an enlarged perspective cross-section view of the gas turbine engine of FIG. 1 showing the sump housing is formed to include a vent passageway having an inlet radial slot and an outlet radial slot on forward and axial ends of the generator to allow a mixture of buffer air and lubrication fluid around the generator away from the annular gap.
Figure 8:
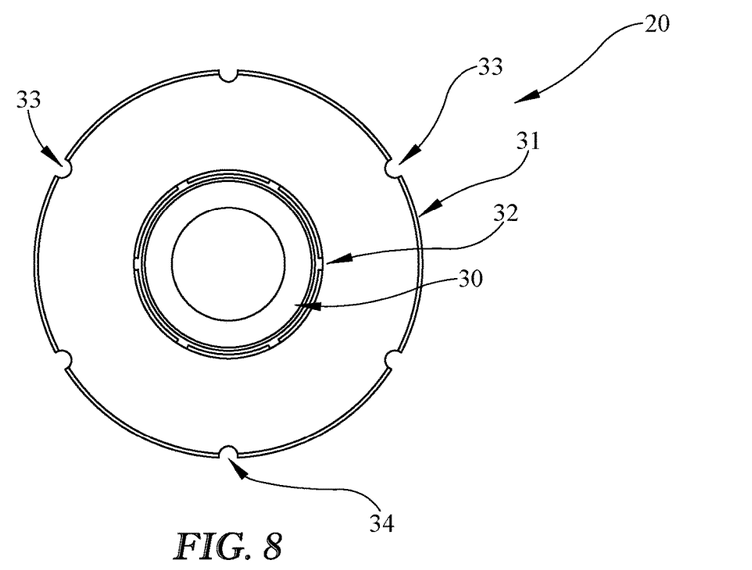
FIG. 8 is a frontal view of the generator included in the gas turbine engine of FIG. 1 showing the stator of the generator includes a plurality of axially extending slots spaced apart circumferentially around the stator.
Figure 9:
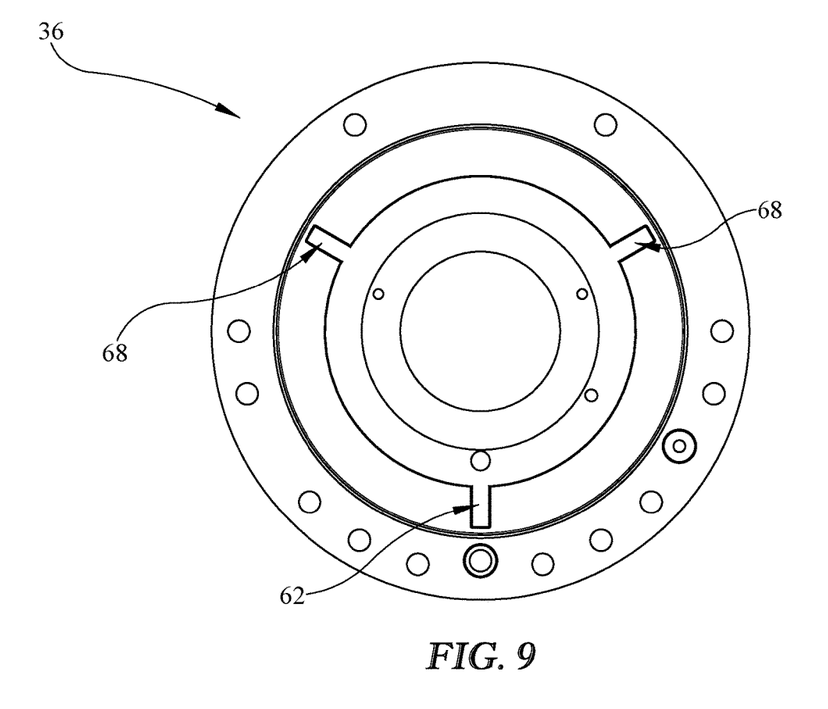
FIG. 9 is a rear view of the sump cover included in the gas turbine engine of FIG. 1 showing the sump cover includes a plurality of radial slots spaced apart circumferentially.

To conduct the buffer air and lubrication mist around the stator 31, the vent passageway 48 includes an inlet radial slot 68, an axially-extending slot 33, and an outlet radial slot 72 as shown in FIGS. 3, 7, and 9. The inlet radial slot 68 extends radially outward from an inlet of the vent passageway 48. The axially-extending slot 33 extends axially along the stator 31 along a linear path from the inlet radial slot 68 to the outlet radial slot 72. The outlet radial slot 72 extends radially inward to an outlet of the vent passageway 48. The inlet and the outlet formed by the radial slots 68, 72 open into the internal chamber 28. Once the buffer air and lubrication mist reaches the aft side of the generator 20, the mist will exit internal chamber 28 through another strut (not shown) included in the sump housing 22.

In the illustrative embodiment, the stator 31 of the generator 20 includes a plurality of axially-extending slots 34, 33 as shown in FIGS. 3-8 and 10. At least one of the axially-extending slots 34 in the stator 31 is circumferentially aligned with the axially-extending slot 64 in the sump housing 22 to define a portion of the first fore scavenge passageway 40 as shown in FIGS. 4 and 10. The other axially-extending vent slots 33 are circumferentially aligned with the radially-extending slot 72 in the sump housing 22 to define a portion of the vent passageway 48. The slots 33 allow the buffer air and lubrication mist mixture to flow around the generator 20 in lieu of passing through the annular gap 32.

In the illustrative embodiment, the sump housing 22 includes a sump cover 36 and a frame 37 as shown in FIGS. 2-7, 9, and 10. The sump cover 36 is located axially forward of the generator 20, while the frame 37 is located axially aft and radially outward of the generator 20. The sump cover 36 is coupled to the frame 37 to locate the generator 20 therebetween. In other embodiments, the sump housing 22 may be a single integral component.

The sump cover 36 includes the first supply passageway 38A, a portion of the first set of fore scavenge passageways 40, 41, and a portion of the vent passageway 48 in the illustrative embodiment. The radial slot 62 of the first fore scavenge passageway 40 and the inlet radial slot 68 of the vent passageway 48 are formed in the sump cover 36. A portion of the second fore scavenge passageway 41 is formed in the sump cover 36 and is in fluid communication with passageway in the front frame to a first outlet port 82.

In the illustrative embodiment, the sump cover 36 includes the radial slot 62 and two inlet radial slots 68 for separate vent passageways 48 as shown in FIG. 9. The inlet radial slots 68 are circumferentially spaced apart from each other and the radial slot 62 of the first fore scavenge passageway 40.

The frame 37 includes a portion of the first supply passageway 38A, the second supply passageway 38B, a portion of the first set of fore scavenge passageways 40, 41, the second set of aft scavenge passageways 42, 43, and a portion of the vent passageway 48 in the illustrative embodiment. The axially-extending slot 64 of the first fore scavenge passageway 40 and the radially-extending vent slot 72 of the vent passageway 48 is formed in the frame 37.

A method for controlling the flow of lubrication fluid into and out of the internal chamber 28 may have several steps. The method begins by starting the gas turbine engine 10 so that the first and second shaft assemblies 24, 26 rotate about the axis 11. The two shaft assemblies 24, 26 may rotate at different speeds.

The lubrication fluid is directed into the internal chamber 28 of the sump housing 22 along the supply flow paths 27A, 27B to lubricate and cool the first bearing 52 and the second bearing 58. The supply flow of lubrication fluid is conducted through a main supply passageway 38 that extends from the supply port 84 through one of the struts included in the frame 37. The main supply passageway 38 is in fluid communication with the supply passageways 38A, 38B to each of the bearings 52, 58. A portion of the supply flow of the lubrication fluid 27A is directed to the first bearing 52 by the first supply passageway 38A, while the remaining portion of the supply flow of the lubrication fluid 27B is directed to the second bearing 58 by the second supply passageway 38B.

After the lubrication fluid lubricates and cools the bearings 52, 58, the lubrication fluid is directed out through the different scavenge passageways 40, 41, 42, 43. For the first bearing 52, the inlet 46 of the second fore scavenge passageway 41 collects a majority of the lubrication fluid 29A. The first discharge flow of lubrication fluid 29A flows through the second fore scavenge passageway 41 to the scavenge port 82.

For any lubrication fluid that makes its way aft through the first bearing 52, the slinger 54 directs the second discharge flow of the lubrication fluid 29B away radially from the rotor 30 to the inlet 44 of the first fore scavenge passageway 40 as shown in FIG. 10. The second discharged flow of lubrication fluid 29B flows through the radial slot 62, along the axially-extending slot 64 next to the generator, and out the angular hole 66. The second discharged flow of lubrication fluid 29B flows into the first aft scavenge passageway 42 for the second bearing 58 to be exhausted out a second outlet port 80.

For the second bearing 58, the inlet 47 of the second aft scavenge passageway 43 collects a majority of the lubrication fluid. The third discharge flow of lubrication fluid 29C flows through the second aft scavenge passageway 43 to the inlet 45 of the first aft scavenge passageway 42. The slinger 60 directs the fourth discharge flow of the lubrication fluid 29D radially outward toward the inlet 45 of the first aft scavenge passageway 42. The second, third, and fourth discharge flows of the lubrication fluid 29B, 29C, 29D flow through the first aft scavenge passageway 42 to the second outlet port 80.

In developing a low cost, expendable engine 10 for a missile application, one of the challenges includes the lubrication fluid management in the sump housing 22 with the embedded generator 20. The generator 20 has a small air gap 32 between the rotating and static components 30, 31 that comprise the electric generator 20. If lubrication fluid gets in this gap 32, the performance of the generator 20 may be negatively impacted. To overcome this, several features were employed to direct and keep lubrication fluid away from this gap 32.

As lubrication fluid, or the lubrication fluid, enters the front frame 37 through the lubrication fluid supply port 84, the supply flow of the lubrication fluid continues onto the shaft assemblies 24, 26 through the strut of the front frame 37. The supply flow of the lubrication fluid divides into two flows 27A, 27B and lubricates and cools both the low-pressure bearing 52 and the high-pressure bearing 58.

In between the two bearings 52, 58 resides the electric generator 20. As stated above, minimizing the amount of lubrication fluid that gets in the gap 32 between the rotor 30 and stator 31 may be a challenge.

For the low-pressure bearing 52, lubrication fluid is introduced on the forward side of the bearing 52. The low-pressure rotor thrust is aft, which will tend to pump the lubrication fluid forward in the bearing 52. The main scavenge pick-up for the low-pressure bearing 52 is located on the forward side of the bearing 52. The second fore scavenge passageway 41 leads to the first outlet port 82.

For any lubrication fluid that makes its way aft through the bearing 52, the slinger 54 is there to direct the lubrication fluid away radially from the gap 32 to the first fore scavenge passageway 40 at the bottom of the sump chamber 28. There is a radial feature or slot 62 in the wall of the front sump cover 36 to help collect the lubrication fluid from the slinger 54 and funnel the lubrication fluid to the axial slot 64 at the bottom.

This axial part of the first fore scavenge passageway 40 is partially formed by the axial slot 64 in the front frame 37 and the axial slot 34 in the generator stator 31. Once the slots 64, 34 are aligned, the slots 64, 34 create a portion of the larger passageway 40. This combination slot that forms the scavenge passageway 40 may be included due to the limited radial space available.

At the aft end of the axial portion of the passageway 40, the passageway 40 includes an angular hole 66 that connects to the aft scavenge port 82. This allows the lubrication fluid to drain into the first aft scavenge passageway 42 to be scavenged from the sump. The passageway 40 was sized such that if all of the lubrication fluid from the bearing 52 were to flow through it, the velocity may be at an acceptable level.

For the high-pressure bearing 58, lubrication fluid is introduced on the forward side of the bearing 58. The high-pressure rotor thrust is forward, which will tend to pump the lubrication fluid aft through the bearing 58. Lubrication fluid that finds its way to the aft side of the bearing 58 is collected in the second aft scavenge passageway 43 and directed to the forward side through the second aft scavenge passageway 43.

The second aft scavenge passageway 43 deposits the lubrication fluid into the inlet 45 of the first aft scavenge passageway 42 for the high-pressure bearing 58. This minimizes the opportunity for the lubrication fluid to find a way to the generator rotor to stator gap 32.

Lubrication fluid on the forward side of the bearing 58 is directed radially outward by the aft slinger 60 where it is collected at the bottom of the sump chamber 28 in the first aft scavenge passageway 42. From here, the lubrication fluid travels out the strut to the aft scavenge port 82. The second set of scavenge passageways 42, 43 may be sized to keep the lubrication fluid velocities to acceptable levels.

The buffer air and lubrication fluid mist flows out of the internal chamber 28 through the vent passageway 48. From the front frame 37, the air will exit and go to a separator to remove the lubrication fluid from the air.

There are three sources of air for the sump housing 22 in the illustrative embodiment. Air may enter the internal chamber 28 of the sump housing 22 through the lip seal and labyrinth seal axially forward and aft of the bearings 52, 58. Air oil mist from the aft sump may also be fed into the internal chamber 28 of the sump housing 22 through the annulus 61 between the shafts 50, 56.

Air from the lip seal and the air from the aft sump would otherwise pass through the generator 20 or around the generator 20 to get to the vent strut in order to exit the sump housing 22. There are two slots 33 on the outer diameter of the generator 20 to allow air to flow around the generator 20 in lieu of passing through the rotor to stator gap 32.

Features on the forward side of the generator 20 have been included in the front sump cover 36 along with features on the aft side of the generator 20 in the front frame 37 to connect with these slots 33. The impact of oil mist on the performance of the generator 20 may not be easily determined, but the present sump housing 22 allows lubrication fluid to flow around the generator 20, while minimizing the amount of oil mist in the rotor to stator gap 32.

As described above, all of the features (slingers, drains, vents, etc.) included in the sump housing 22 are in the horizontal position. Another advantage of these features is that it allows them to continue to manage the oil with the engine 10 in either a nose up or nose down attitude. This is an important function as the engine 10 will need to fly in various attitudes and the generator 20 will be required to perform at a high level.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
    a sump housing for collecting lubrication fluid and air used in the gas turbine engine, the sump housing being arranged circumferentially around an axis to define an internal chamber within the sump housing,
    an electric generator located in the sump housing and configured to produce electric energy during use of the gas turbine engine, the electric generator including a rotor configured to rotate about the axis and a stator arranged circumferentially around the rotor and fixed to the sump housing, and the stator being spaced apart radially from the rotor to form an annular gap between the stator and the rotor, and
    a first shaft assembly arranged along the axis, the first shaft assembly including a first shaft that extends axially through the rotor and configured to rotate about the axis, a first bearing coupled to the first shaft, and a first slinger coupled with the first shaft for rotation with the first shaft,
    wherein the first slinger is located axially between the first bearing and the electric generator and the first slinger extends radially outward away from the first shaft to direct the lubrication fluid in contact with the first slinger radially outward away from the axis so that the lubrication fluid is directed away from the annular gap between the stator and the rotor.

2. The gas turbine engine of claim 1, wherein the sump housing is formed to define a first scavenge passageway that extends radially into the sump housing for conducting the lubrication fluid out of the internal chamber of the sump housing and wherein an inlet of the first scavenge passageway is axially aligned with the first slinger so that at least a portion of the lubrication fluid directed radially outward by the first slinger is directed into the inlet.

3. The gas turbine engine of claim 2, wherein the sump housing is formed to define a second scavenge passageway that extends radially into the sump housing and an inlet of the second scavenge passageway is spaced apart axially from the inlet of the first scavenge passageway to locate the first bearing axially between the inlet of the first scavenge passageway and the inlet of the second scavenge passageway.

4. The gas turbine engine of claim 3, wherein an outlet of the second scavenge passageway is arranged to direct the lubrication fluid into the first scavenge passageway.

5. The gas turbine engine of claim 2, wherein the first scavenge passageway extends radially inward from the inlet and then extends axially along the stator included in the electric generator along a linear path.

6. The gas turbine engine of claim 5, wherein the sump housing is formed to include an axially extending first slot and the stator is formed to include an axially extending second slot circumferentially aligned with the axially extending first slot to define a portion of the first scavenge passageway.

7. The gas turbine engine of claim 1, further comprising a second shaft assembly arranged along the axis, the second shaft assembly including a second shaft that extends axially through the rotor and configured to rotate about the axis, a second bearing coupled to the second shaft, and a second slinger coupled with the second shaft for rotation with the second shaft, wherein the second slinger is located axially between the second bearing and the electric generator to locate the electric generator axially between the first slinger and the second slinger, and the second slinger extends radially outward away from the second shaft.

8. The gas turbine engine of claim 7, wherein the sump housing is formed to define a first scavenge passageway having a first inlet that opens into the internal chamber and a second scavenge passageway having a second inlet that opens into the internal chamber, the first inlet is aligned axially with the first slinger, the second inlet is aligned axially with the second slinger, the first inlet is spaced apart axially from the second inlet to locate the stator axially between the first inlet and the second inlet, and the first scavenge passageway extends axially along the stator and opens into the second scavenge passageway.

9. The gas turbine engine of claim 1, wherein the sump housing is formed to include a vent passageway configured to conduct air and lubrication mist around the stator, the vent passageway includes an inlet and an outlet that open into the internal chamber, the vent passageway extends radially outward from the inlet, then turns and extends axially along the stator, and then turns radially inward to the outlet.

10. A gas turbine engine comprising
  a sump housing for collecting lubrication fluid and air used in the gas turbine engine, the sump housing being arranged circumferentially around an axis to define an internal chamber,
  an electric generator located in the sump housing and configured to produce electric energy during use of the gas turbine engine, the electric generator including a rotor configured to rotate about the axis and a stator arranged circumferentially around the rotor and fixed to the sump housing for movement with the sump housing, and
  a first shaft assembly arranged along the axis, the first shaft assembly including a first shaft that extends axially through the rotor and configured to rotate about the axis, a first bearing coupled to the first shaft, and a first slinger coupled with the first shaft for rotation with the first shaft,
  wherein the first slinger is located axially between the first bearing and the electric generator and the first slinger extends radially outward away from the first shaft to direct the lubrication fluid in contact with the first slinger radially outward away from the axis.

11. The gas turbine engine of claim 10, wherein the sump housing is formed to define a first scavenge passageway that extends radially into the sump housing and wherein an inlet of the first scavenge passageway is axially aligned with the first slinger.

12. The gas turbine engine of claim 11, wherein the sump housing is formed to define a second scavenge passageway that extends radially into the sump housing and an inlet of the second scavenge passageway is spaced apart axially from the inlet of the first scavenge passageway to locate the first bearing axially between the inlet of the first scavenge passageway and the inlet of the second scavenge passageway.

13. The gas turbine engine of claim 11, wherein the first scavenge passageway extends radially inward from the inlet and then extends axially along the stator included in the electric generator along a linear path.

14. The gas turbine engine of claim 13, wherein the sump housing is formed to include an axially extending first slot and the stator is formed to include an axially extending second slot circumferentially aligned with the axially extending first slot to define a portion of the first scavenge passageway.

15. The gas turbine engine of claim 10, further comprising a second shaft assembly arranged along the axis, the second shaft assembly including a second shaft that extends axially through the rotor and configured to rotate about the axis, a second bearing coupled to the second shaft, and a second slinger coupled with the second shaft for rotation with the second shaft, wherein the second slinger is located axially between the second bearing and the electric generator to locate the electric generator axially between the first slinger and the second slinger, and the second slinger extends radially outward away from the second shaft.

16. The gas turbine engine of claim 15, wherein the sump housing is formed to define a first scavenge passageway having a first inlet that opens into the internal chamber and a second scavenge passageway having a second inlet that opens into the internal chamber, the first inlet is aligned axially with the first slinger, the second inlet is aligned axially with the second slinger, the first inlet is spaced apart axially from the second inlet to locate the stator axially between the first inlet and the second inlet, and the first scavenge passageway extends axially along the stator and opens into the second scavenge passageway.

17. The gas turbine engine of claim 10, wherein the sump housing is formed to include a vent passageway configured to conduct air and lubrication mist around the stator, the vent passageway includes an inlet and an outlet that open into the internal chamber, the vent passageway extends radially outward from the inlet, then turns and extends axially along the stator, and then turns radially inward to the outlet.

18. A method comprising
  providing a gas turbine engine that includes a sump housing for collecting lubrication fluid and air used in the gas turbine engine, an electric generator located in the sump housing and configured to produce electric energy during use of the gas turbine engine, and a first shaft assembly arranged along an axis, the electric generator including a rotor configured to rotate about the axis and a stator arranged circumferentially around the rotor and fixed to the sump housing for movement with the sump housing, and the first shaft assembly including a first shaft that extends axially through the rotor and configured to rotate about the axis, a first bearing coupled to the first shaft, and a first slinger coupled with the first shaft for rotation with the first shaft,
  starting the gas turbine engine so that the first shaft assembly rotates about the axis, directing a flow of lubrication fluid into an internal chamber of the sump housing to lubricate and cool the first bearing, and directing the flow of lubrication radially outward away from the axis with the first slinger so that the lubrication fluid is guided away from an annular gap between the stator and the rotor of the electric generator.

19. The method of claim 18, wherein the sump housing is formed to define a first scavenge passageway that extends radially into the sump housing and wherein an inlet of the first scavenge passageway is axially aligned with the first slinger so that at least a portion of the lubrication fluid directed radially outward by the first slinger is directed into the inlet.

20. The method of claim 19, wherein the first scavenge passageway extends radially inward from the inlet and then extends axially along the stator included in the electric generator along a linear path.

\* \* \* \* \*